INVENTOR
JAMES HURN
BY Shoemaker and Mattare
ATTORNEYS

United States Patent
Hurn

[15] 3,693,683
[45] Sept. 26, 1972

[54] METHOD AND APPARATUS FOR WORKING ELONGATE COMPONENTS AT SUCCESSIVE LONGITUDINAL LOCATIONS

[72] Inventor: James Hurn, Fresford, England
[73] Assignee: Hurn Brothers Engineering Limited, Melksham, Wiltshire, England
[22] Filed: April 17, 1970
[21] Appl. No.: 29,568

[30] Foreign Application Priority Data
April 17, 1969 Great Britain..........19,636/69

[52] U.S. Cl..................144/325, 144/24 C, 408/70, 144/3 R
[51] Int. Cl. ............................................B27m 3/00
[58] Field of Search........144/3, 35, 2, 133, 136, 325, 144/326, 200, 203, 246, 309; 83/279, 283; 408/70; 143/46 F

[56] References Cited

UNITED STATES PATENTS

| | | | |
|---|---|---|---|
| 3,090,261 | 5/1963 | Hill | 408/70 X |
| 2,835,290 | 5/1958 | Boettcher | 408/70 |
| 498,555 | 5/1893 | Kelchner et al. | 408/70 X |

*Primary Examiner*—Donald R. Schran
*Attorney*—Shoemaker & Mattare

[57] ABSTRACT

The invention is concerned with a method of and apparatus for performing a succession of working operations at preselected locations along the length of an elongate workpiece. The leading end of the workpiece is advanced up to a datum position. On the upstream side of the datum position there is located a drive roller, and on the downstream side of the datum position there is located a working station. The work station has at a predetermined distance from the datum position, at least one working tool, for example a saw or a drill. The workpiece is held against the drive roller, and then said drive roller is rotated through a succession of rotary movements, with the drive roller being stationary between movements for predetermined time intervals. During each movement the drive roller is rotated through a predetermined amount. The workpiece is thereby advanced in successive steps through said work station and successive preselected locations longitudinally of the workpiece are brought opposite the working tool, and held stationary for predetermined time intervals between the periods of movement. A second drive roller is located on the downstream side of the work station which is driven in synchronism with the upstream drive roller. Working operations are only performed when the workpiece is stationary.

7 Claims, 14 Drawing Figures

INVENTOR
JAMES HURN
BY Shoemaker and Mattare
ATTORNEYS

METHOD AND APPARATUS FOR WORKING ELONGATE COMPONENTS AT SUCCESSIVE LONGITUDINAL LOCATIONS

This invention relates to methods and apparatus for positioning an elongate workpiece, such as a length of timber or of metal in bar, sheet, tubular, or other form, so that it may be cut or worked at any preselected place along its length.

This invention has for one object to provide a method and apparatus whereby an elongate workpiece may be brought to positions where it may be accurately worked, e.g., by sawing, trenching, milling, shearing or drilling at successive locations along its length with manual intervention during such working operations being minimal.

In the case of a length of timber for use in a frame for a building, it may be necessary to perform a large number and variety of operations over the length of the timber. Thus, it may be required to form with a trenching tool a plurality of recesses of differing depths and widths and at differing intervals along one side of the length, and along the opposite side of the length a further set of recesses which differ from those on the first side both as regards their spacing from one another and as regards the dimensions of the individual recesses. Furthermore, the same length may require to have holes of differing sizes formed in it at a variety of intervals over its length. All these operations may differ from one another and may require as to their location great accuracy. A timber floor joist of 12.0 feet length may require as many as 25 different operations over its length and even though such a job is usually produced in batches, the setting up time for each batch necessitated for manual production by pattern and jig is very disadvantageous and costly.

Broadly stated the invention provides a method of performing a succession of working operations at preselected locations along the length of an elongate workpiece which includes the steps of advancing the leading end of the workpiece up to a datum position, on the upstream side of which datum position there is located a drive roller, and on the downstream side of which datum position there is located a working station with, at a predetermined distance from the datum position, at least one working tool; holding the workpiece against said drive roller, and then rotating said drive roller through a succession of rotary movements, with the drive roller being stationary between movements for predetermined time intervals, and during each movement being rotated through a predetermined amount, all whereby said workpiece is advanced in successive steps through said work station and successive preselected locations longitudinally of the workpiece are brought opposite the working tool, and held stationary for predetermined time intervals between the periods of movement.

During the periods when the workpiece is stationary, a working operation will be performed upon it. For example, if there is but one tool, the workpiece will be progressively advanced past the tool and this will be employed for a working operation each time the workpiece stops. However, and more usually, a variety of operations is required for a single workpiece and to this end a number of working tools may be located at the work station each at a known distance from the datum position.

For example, at 2 feet from the datum position there may be arranged to make passes into the opposite sides of a timber length, a pair of trenching tools. At a further interval from the datum position there may be arranged a first drill and at a still further interval, a second drill having a differently sized bit. In such a case the workpiece will be advanced in such manner as to bring successive locations opposite the requisite tools which are then selectively operated. It will be understood that although each tool will be arranged to move or pass through the workpiece the trench cut, or the drilled hole, so formed will always be at a predetermined known distance from the datum position, which controls the starting position for the workpiece.

The successive rotary and part rotary movements of the driven roller may readily be controlled by way of a positional gear box and the drive from the gear box is conveniently by shaft and worm and pinion gearing to avoid back-lash. Preferably also, one or more of such driven rollers is arranged at each side of the work station so that movement of the workpiece may be controlled even after it has passed out of engagement with the roller on the upstream or input side of the work station. It is essential that all driven rollers are driven in synchronism preferably from the same drive shaft.

The datum line is required in order to establish the position of the leading end of the workpiece relative to the drive roller or rollers before the workpiece enters the work station. The roller or rollers then advance the workpiece over a succession of measured movements past the datum line. During each successive movement, the roller or rollers are rotated a predetermined amount and hence the leading end of the workpiece is moved a corresponding distance further away from the datum position.

The datum position may take mechanical form as an end stop which is moved initially into the path taken by the workpiece before it reaches the work station. The leading end of the workpiece is moved into abutment with the end stop. The workpiece is then urged against the drive roller or rollers and the instantaneous position of the roller or rollers at this time is established as a 'start' position from which all subsequent successive rotations or partial rotations can be measured. Accordingly the end stop which has enabled the 'start' position of the drive roller or rollers to be established, can now be removed and the working procedure commenced.

In an alternative arrangement, the datum position can be constituted by a switching device, e.g., photo electric switch means, or by an electro mechanical trigger switch. Such switch will be actuated by the leading end of the workpiece as it passes the switch. The 'start' position of the drive roller or rollers will then be established by operation of the switch and the successive rotary movements of the drive roller or rollers can be measured from the start position.

Above each driven roller and co-operating therewith is an idler roller which bears on the workpiece to prevent slip between the workpiece and the driven roller.

The idler roller is arranged for upward and downward movement to accommodate workpieces of different thickness, and conveniently a pneumatic ram and cylinder assembly effects the movement of the idler either to a position out of engagement with the workpiece or to a position where it bears on the workpiece and urges it against the co-operating driven roller.

In certain cases, it is envisaged, for some jobs, that three or more workpieces can conveniently be processed simultaneously by being laid together and passed through the machine in this condition. This will not always be possible with thicker workpieces or with all possible working operations.

It is considered preferable for the workpiece to rest on the driven roller and to have the idler roller located above the workpiece and operative to press it downwardly on to the driven roller.

However, if the nature of the workpiece so dictates both the driven roller and the operating idler roller could rotate about vertical axes with the workpiece being sandwiched between them.

Advantageously, each working tool, be it a trench saw or drill, will have associated with it means for clamping the workpiece so that the workpiece will be steadied at the required location, when that particular tool performs its operation on the workpiece.

Pneumatic circuitry with rams and cylinders conveniently control the various clamping devices.

As the workpiece passes through the machine it will be urged laterally against a fixed fence and will bear against idler rollers. When the workpiece is stopped for the performance of a working operation, the clamping devices will operate laterally to hold the workpiece against the fixed fence.

Such fence will constitute a datum from which can be measured the distance across the width of the workpiece of a location at which a tool is to perform its work.

The tool may be adjusted to this distance again by pneumatic circuitry which will then cause the tool to operate the workpiece in a vertical pass either upwardly or downwardly.

After the pass, the clamping means are disengaged and the drive rollers operated to advance the workpiece to bring a different longitudinal location opposite the same tool or to bring the same longitudinal location just worked opposite a different tool.

The various successive operations of the pneumatic circuitry for the clamps and tools, are readily susceptible to control by preprogrammed tape with the aid of a positional sequence and control mechanism of known kind. Such a mechanism is also conveniently employed to drive the positional gearbox for driving in synchronism the advance drive rollers.

It will be appreciated that the accurate functioning of the machine will to a large extent be dependent on the accuracy with which the drive rollers effect successive advance movements and stoppages of the workpiece and that such accuracy will be impaired if the workpiece slips on the drive rollers.

To this end it is preferably to employ a number of drive rollers each with its own co-operating idler pressure roller and each driven in synchronism preferably by split worm gear drive from a single transmission shaft. In one practical embodiment the drive rollers have diameters of 24 inches and the ratio of the worm drive gearing is 24 : 1 so that each rotation of the transmission shaft represents 1 inch of advance movement. Accelerations during advance and braking movements may be kept low without disadvantage since while the workpiece is being moved the opportunity is available to position one or other tool for the next working operation. Provided that the accelerations are below 165 in./sec.$^2$ satisfactory operation is reliably obtained.

When programmed tape control is employed, the programming of 25 successive operations performed on 12 feet length of floor joist may be obtained on a 3 foot length of tape. This, together with say, a drawing is the only record necessary to keep in anticipation of a repeat operation. This has to be compared with the present necessity of storing large patterns.

Again using this example of a 12 feet length with 25 successive operations, 15 of which are trenching and 10 drilling, the setting up time of a machine according to the invention equipped with trenching and drilling heads, is only that occasioned by identification and retrieval of the tape followed by feeding of the tape to the control mechanism. So soon as the latter is started the first workpiece is fed to the machine. With this must be compared the conventional methods of employing patterns and jigs; with the identification and retrieval of the large pattern from store and the setting up time of the jig.

Actual production of individual workpiece may involve a time saving of 5 : 1, a saving on manpower of 3 : 1 and a significant increase in accuracy. Perhaps most important of all, the risk of human injury is greatly reduced.

By way of example, the invention will now be described in greater detail with reference to the accompanying drawings, in which, FIGS. 1A, 1B and 1C are views of typical finished wooden building components.

FIGS. 1A, 1B and 1C show typical finished wooden building components which have been trenched and drilled at irregular intervals. The components of FIGS. 1B and 1C each have been drilled using two differently sized bits. It will become apparent from the following description that such components may advantageously be manufactured using the apparatus of the present invention.

Figure 9:
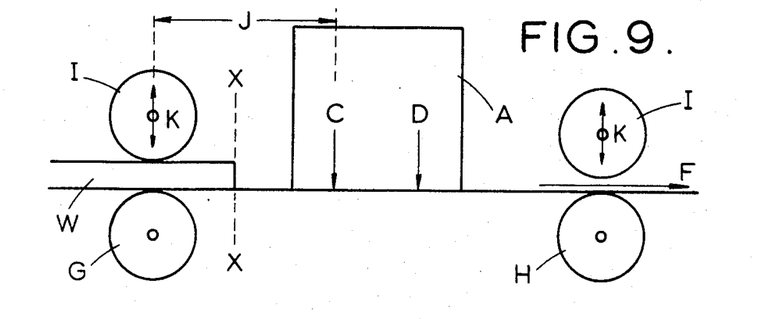
Figure 9A:
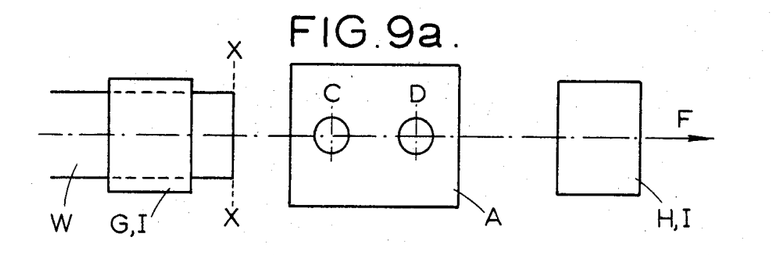
FIGS. 9a and 10a are diagrammatic plan views corresponding to the side views of FIGS. 9 and 10 respectively.

Referring now to FIG. 9, A represents a work station and W is an elongate workpiece over the length of which it is desired to form a series of working operations by means of tools located in the work station A. In FIG. 9, C and D represent the working positions of two tools. For example, the tool working at position C may be a trenching saw and the tool at position D a drill.

In order to perform a series of working operations accurately on the workpiece, it is necessary for successive locations of the workpiece to be brought accurately to positions C or D. To this end the workpiece requires to be moved in a series of steps along a path indicated by arrow F through the work station A.

According to the invention, such movement is controlled so far as the leading end of the workpiece W is concerned by a drive roller G which is driven through a succession of rotary movements. The workpiece is held against the drive roller G and is hence advanced in a series of steps. However, the drive roller G being located on the upstream or input side of the work station will not be able to control advance movement of the trailing end of the workpiece. Accordingly, there is provided a second drive roller H on the output or downstream side of the work station A, which is driven in synchronism with the drive roller G.

In order to obtain accuracy it is necessary to locate the leading end of the workpiece W relative to the instantaneous angular position of the drive rollers G and H and to the working positions C and D at the start of the operation. For this reason it is necessary to have a datum position which may be constituted or established by a simple mechanical stop or a photoelectric device. When the leading edge of the workpiece W is placed at the datum position, the drive rollers can then be started in rotation to advance the workpiece through a series of measured movements from this position. The datum position must be on the upstream or input side of the first tool of the work station and on the output or downstream side of a drive roller. Thus in FIG. 9 the datum position must lie in the region indicated by the arrows J, and for example is at the position X — X.

Figure 10:
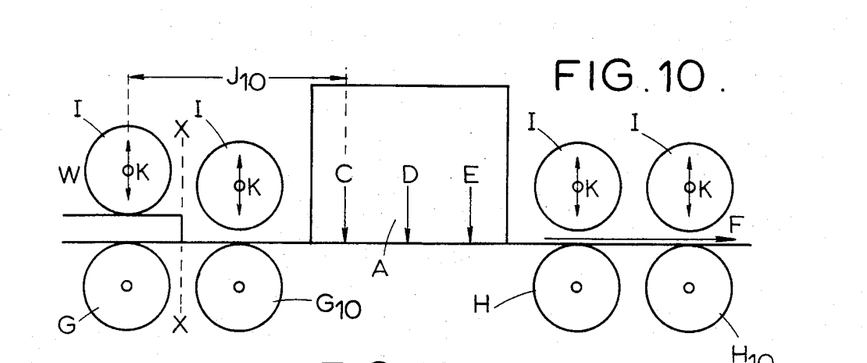

In FIG. 10 the work station includes an additional tool, for example a drill or a cut off saw operating at position E. Furthermore in this FIG. 10 additional drive rollers G10 and H10 are provided so that the workpiece W may be engaged over an increased area, as compared with the arrangement of FIG. 9, and so reduce the possibility of the workpiece slipping on the drive rollers. All drive rollers are driven in synchronism.

The datum position in the arrangement of FIG. 10 must lie in the region designated by the arrows J10 and conveniently it is at position X—X between the two input drive rollers G and G10.

Finally, the distance of each working tool from the datum position must be known with accuracy.

In order to maintain the workpiece in engagement with the drive rollers and prevent slipping, each drive roller has co-operating with it an idler roller I. Each roller I is movable in the direction of the arrows K, and this accommodates workpieces of different thicknesses.

As will be described with reference to FIGS. 2 to 6 the rollers on the upstream and downstream sides of the work station together with their respective co-operating idler rollers I are conveniently constituted as single drive roller units.

As will be described with reference to FIGS. 7 and 8 the rollers G and G10 together with their idler rollers I are grouped in a twin roller drive unit as are the output rollers H and H10 together with their respective idler rollers I.

Reference will now be had to FIGS. 2 to 6 which show in various views an example of a wood-working machine constructed substantially in accordance with the general principles described above with reference to FIG. 9.

Figure 2:
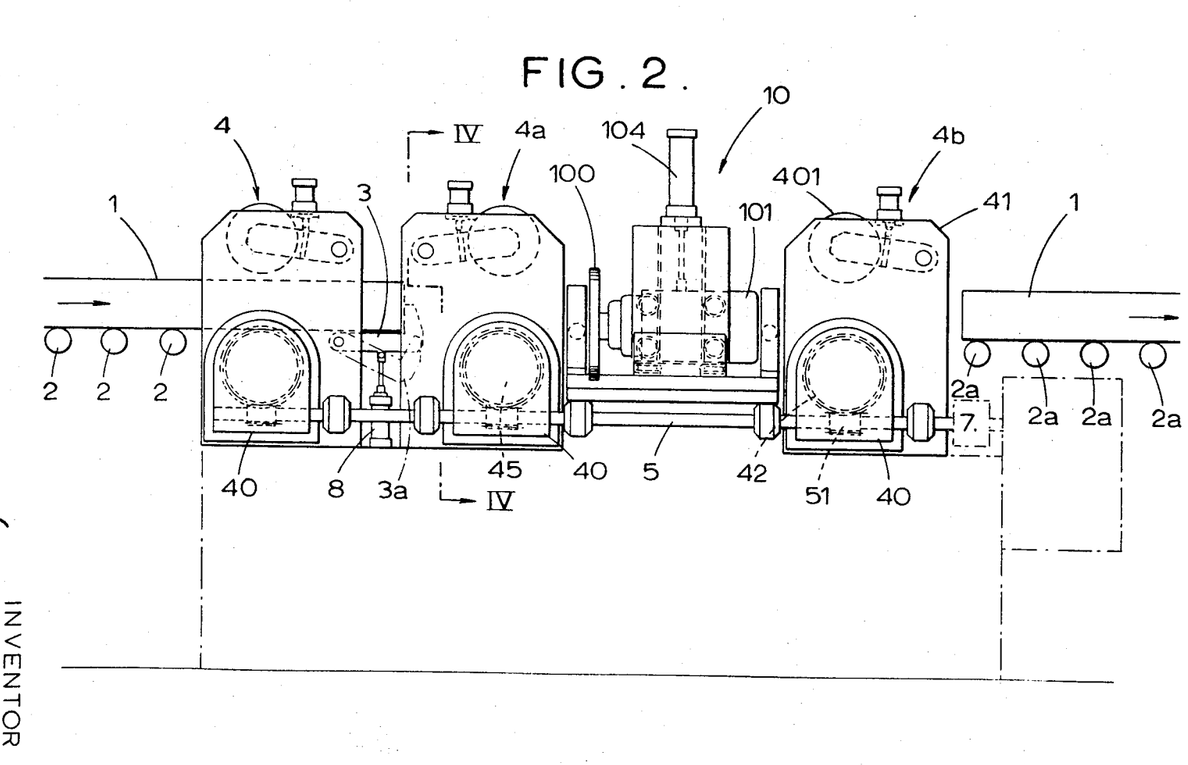
FIG. 2 is a side elevational view of an embodiment of the apparatus of the present invention.

With reference to FIG. 2, in order to trench, drill or otherwise work a blank baulk or length of timber, the timber length 1 is fed across conveyor rollers 2 into the apparatus and its leading end is taken past a first driven roller unit generally designated 4 which is located on the upstream side of a datum position constituted by a movable end stop 3.

The driven roller unit 4 is arranged to advance the timber length 1 eventually to further roller units 4a and 4b. The roller units are substantially similar to one another in construction and by way of example the unit 4a will now be described in greater detail with reference to FIGS. 4 and 5.

Figure 4:
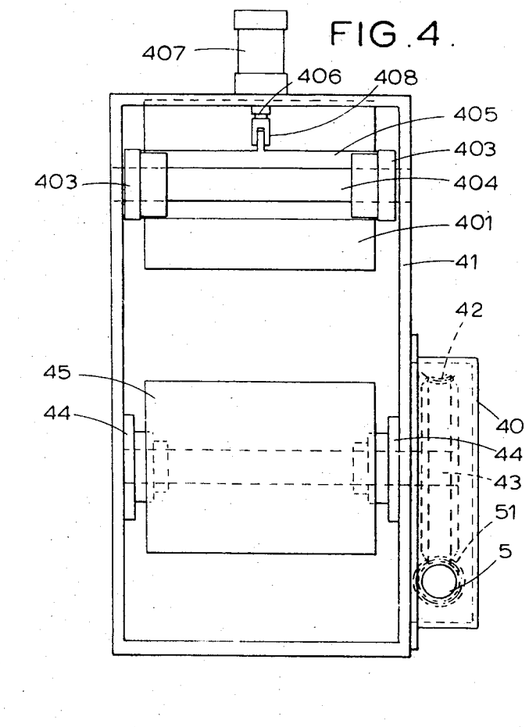
FIG. 4 is a view of a driven roller unit along the line IV—IV of FIG. 2, and is to a greater scale than FIG. 2.
Figure 5:
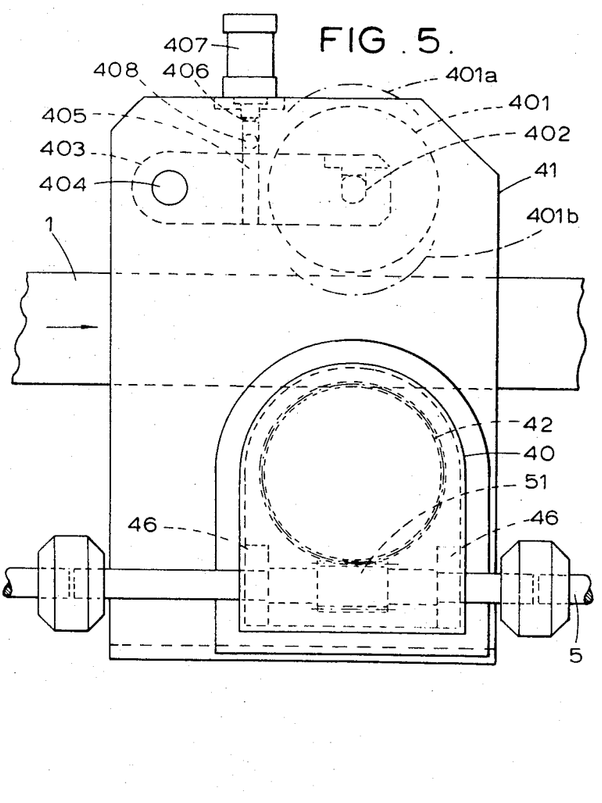
FIG. 5 is a side elevational view of the driven roller unit of FIG. 4.

As shown in FIGS. 4 and 5, a drive shaft 5 passes through an oil filled gear box housing 40 mounted on the outside of a driven roller unit casing 41. The casing 41 is open ended to permit passage of baulks of timber. A worm gear 51 is provided on the shaft 5 and engages with a gear wheel 42. The gear wheel 42 is mounted on a shaft 43 which extends transversely of the unit and is carried in bearings 44 on the casing 41. Mounted on the shaft 43 between the bearings 44 is a drive roller 45. If the diameter of the roller 45 is 7.639 inches it will have a circumference of 24 inches. If also there is a reduction of 24 : 1 between the worm gear 51 and the gear wheel 42, contained within the gear box casing 40, for one revolution of the drive shaft 5, and in the absence of slipping between drive roller 45 and timber length 1, a timber length 1 carried on the drive roller 45 is advanced one inch, and this will clearly facilitate advancement of the baulk by a desired and specified amount. Seals 46 may be provided within gear box 40 where the drive shaft 5 enters and leaves the gearbox to prevent leakage of oil from the gear box.

To prevent slipping between each drive roller 45 and a timber length 1, there is provided, above the path which a baulk is intended to take, an idler roller 401. This idler roller is rotatable about a shaft 402 carried between levers 403 pivoted about a further shaft 404 carried on the casing 41 of the roller unit. A transverse strut 405 extends between the levers 403 and is attached to the levers at locations intermediate the shafts 402 and 404. The strut 405 is pivotally joined at 408 to a piston rod 406 of a pneumatic ram and cylinder unit 407, so that by operation of the pneumatic ram and cylinder unit 407, the idler roller 401 may be raised either to a position indicated at 401a or lowered to a position indicated at 401b (FIG. 5). The idler roller thus accommodates and bears down on various sizes of timber length 1 which may be fed into the apparatus and hence tends to counter any slipping between the baulk and the drive roller 45.

It is envisaged that the stroke of the pneumatic cylinder and ram unit 407 may be such as to impart a total upward and downward movement of say 2 inches to the idler roller 401, the idler roller being situated at such a distance above the drive roller 45 that there may be accommodated, between the idler roller 401 and the drive roller 45, a timber length of say from 4 to 6 inches in thickness.

It will be appreciated that if it is desired to perform a similar operation on two or more baulks of lesser thickness, the baulks may be fed into the machines one on top of the other, provided only that the total thickness of the baulks does not exceed the maximum distance between the idler roller 401 and the drive roller 45.

Figure 3:
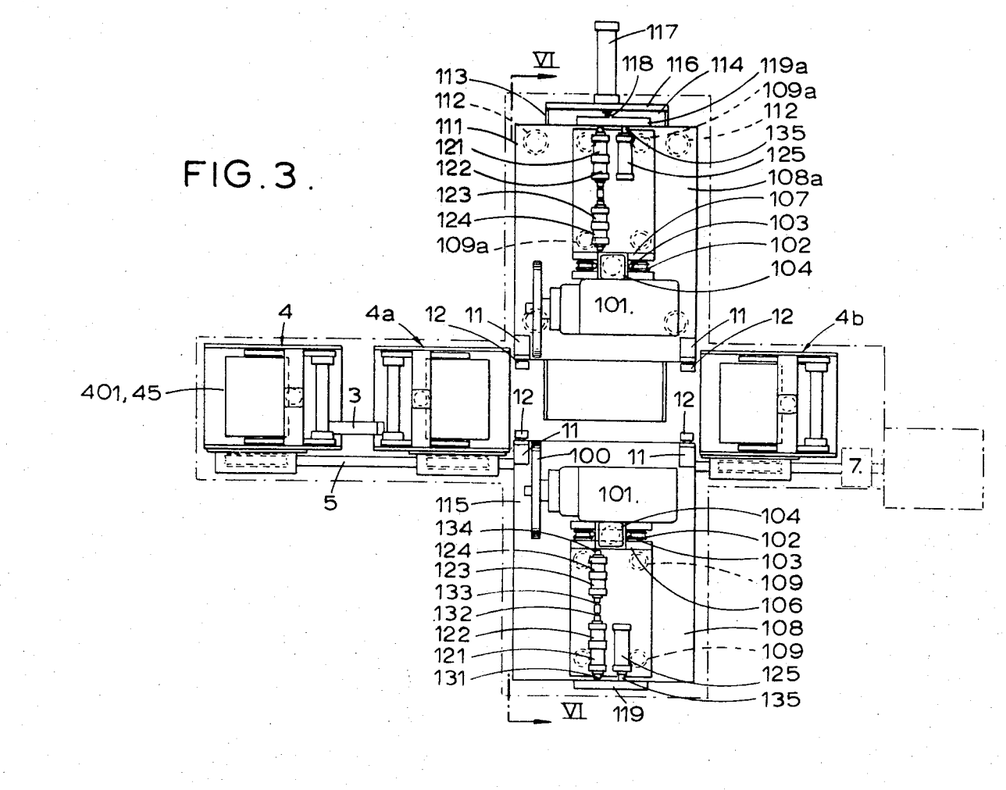
FIG. 3 is a plan view corresponding to FIG. 2.

Referring now to FIGS. 2 and 3, the length of timber to be worked is first advanced up to the datum position constituted by end stop 3. A brake 7 prevents rotation of drive shaft 5 until the leading end of the timber length 1 comes into abutment with the end stop 3. This provides a datum position for the end of the timber length.

End stop 3 is lowered to the position (shown at 3a in FIG. 2) under the control of a pneumatically operated ram and cylinder assembly 8, so that the timber length 1 is free to advance when driven by the roller unit 4.

In the embodiment illustrated, the second drive roller unit 4a is situated on the downstream side of the end stop 3 and its rotation is effected by the same drive shaft 5 so as to operate in synchronism with the roller unit 4.

A further drive roller unit 4b is provided on the downstream side of the unit 4a and between these two units is a work station generally designated 10 incorporating one or more woodworking tools.

All drive rollers 45 of the units 4, 4a and 4b are driven in synchronism.

In the absence of slipping between the drive rollers 45 and the timber length 1, it is clear that the distance of advancement of the baulk for any given rotation of the drive shaft 5 may easily be ascertained. Thus, if a tool of work station 10, for example, as shown, the blade 100 of a saw or trench is provided at a known distance from the datum position afforded by the end stop 3, then by rotating drive shaft 5 by a predetermined amount, a point at a desired distance from that end of the timber length 1 which was in abutment with the end stop 3, can be brought into alignment with the tool, so that an operation, e.g., sawing or trenching, may be performed at any desired point along the baulk.

After a given working operation has been performed the shaft 5 may again be operated to advance the timber length a predetermined distance and bring it to rest. Slipping may be avoided since accelerations during advance and braking movements may be kept low without disadvantage since while the workpiece is being moved the opportunity is available to position one or other tool for the next working operation. Provided that the accelerations are below 165 in./sec.$^2$ satisfactory operation is reliably obtained.

Figure 6:
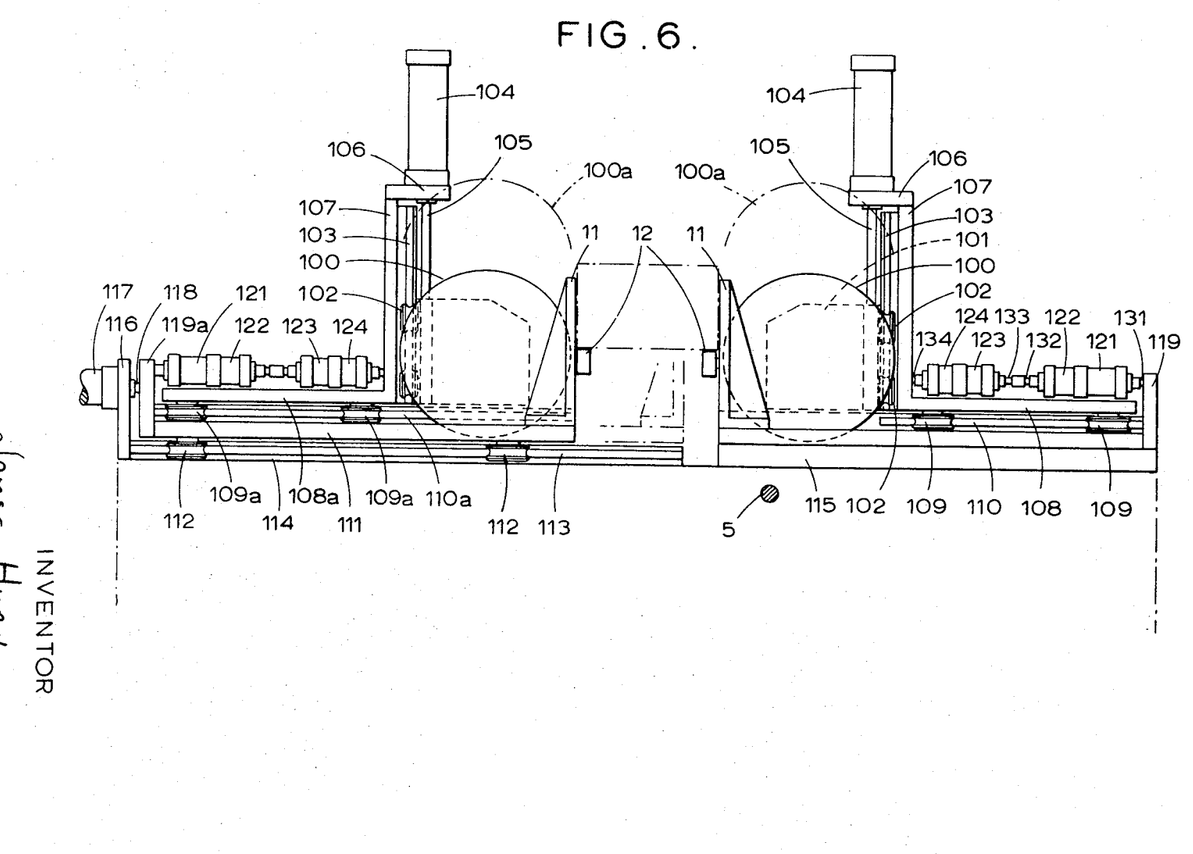
FIG. 6 is a view along the line VI—VI of FIG. 3.

As will be seen in the embodiment illustrated in FIGS. 2, 3, and 6, there are provided two trenching saw blades 100, one on either side of the path taken by the timber length, so that trenches may be cut in both sides of the timber length.

The particular work station 10 comprising two trenching saw, illustrated will now be described in greater detail with reference to FIGS. 3 and 6.

Motors 101 for the saw or trenching blades 100 are each provided with sets of four rollers 102, each set of four rollers being arranged to run on two substantially vertical tracks 103 carried on posts 107. Each saw blade 100 and motor 101 is adapted to be raised and lowered by a pneumatic ram and cylinder assembly 104 which is connected to the respective saw motor 101 by a connecting rod 105. The stroke of each pneumatic ram and cylinder assembly 104 will be such that the movement afforded thereby to its respective saw is sufficient to move the saw blade 100 from its rest position (as shown in FIGS. 2 and 6) where its center is lower in level than the bottom edge of a baulk of timber 1 to a position 100a (FIG. 6) where its center would be higher in level than the top edge of the thickest baulk the apparatus is arranged to work.

The pneumatic ram and cylinder assemblies 104 are supported by brackets 106 carried at the top of the vertical posts 107 which also support the vertical roller tracks 103.

One of these vertical posts 107 is attached at the inner edge of a cross slide 108 carried on rollers 109 which are adapted to traverse a horizontal track 110 this track being carried on a fixed base member 115 mounted on the base frame of the machine.

Rollers 109a mounted under a second cross slide 108a on the other side of the work station are arranged to traverse horizontal tracks 110a which are carried on a third cross-slide 111, the three cross-slides all being individually slidable transversely of the path taken by a length of timber passing through the machine. This third cross-slide is borne by rollers 112 carried on tracks 113 on a fixed base member 114 mounted on the base frame of the machine.

Guide posts 11 equipped with idler rollers 12 are mounted one at each inner corner of the third cross-slide 111, and further guide posts 11 are mounted one at each inner corner of the fixed base member 115 mounted on the base frame of the machine. The posts 11 constitute side fences for the timber lengths, those attached to member 115 being fixed, and those attached to cross-slide being movable as described below.

The upper edges of the idler rollers 12 are at the same level as the upper edges of the drive rollers 45 of the units 4, 4a, 4b, and the timber length is carried on these rollers 12 and 45.

On the outer edge of the member 114 carrying tracks 113 is mounted a vertically extending bracket 116 which is adapted to carry the cylinder of a pneumatic ram and cylinder device 117 having a piston rod 118 attached to a vertically extending bracket 119a mounted on the outer edge of cross-slide 111. This pneumatic ram and cylinder device 117 and its rod are adapted to move the cross-slide 111, and the second cross-slide 108a and associated tools and guide posts 11 and guide fence rollers 12 carried thereon, towards or away from the fixed fence constituted by the guide post 11 fixed to member 115, so as to accommodate different widths of timber between the guide posts 11 of the machine.

At the outer edge of member 115 carrying tracks 110 for the first cross-slide 108 is mounted a vertically extending abutment bracket 119, while to the outer edge of cross-slide 111 is a similar abutment bracket 119a.

To the inner surfaces of the brackets 119, 119a are attached substantially similar pneumatic ram and cylinder means which respectively extend between the inner surfaces 119, 119a and associated vertical members 107 carried respectively on cross slides 108 and 108a and said ram and cylinder means control the movement of the cross-slides 108 and 108a.

The pneumatic ram and cylinder means last above referred to are arranged thus to move the cross-slides 108 and 108a towards and away from a timber length 1 while the ram and cylinder devices 104 control the vertical movements of the saws relative to the cross-slides. It will be appreciated that similar control means may be associated with other tools mounted on the cross-slides to effect their intended operations on the timber length.

In the embodiment illustrated, the pneumatic ram and cylinder means controlling horizontal movement of the cross-slides 108 or 108a consists of four cylinders 121, 122, 123, and 124, and associated piston rods respectively 131, 132, 133 and 134, the cylinders being arranged in two pairs, each pair being mounted back to back. Rods 131 are attached respectively to brackets 119 or 119a and rods 134 to their respective vertical member 107.

The cylinders 121, 122, 123, 124 may suitably have respective strokes of 1 inch, ½ inch, ¼ inch and ⅛ inch to give a total possible movement of the cross-slides 108, 108a of 1⅞ inches, in ⅛ inch steps. A movement of this amount is found sufficient to accommodate the cutting of the deepest trenches in baulks of timber which are normally required.

As will be seen from FIG. 3, further pneumatic cylinders 125 are mounted, one on each cross-slide 108, 108a, associated piston rods 135 of the pneumatic cylinder means 125 being attached to the respective vertically extending brackets 119, 119a. These pneumatic ram and cylinder means 125, 135 are arranged to act as checks on the movement of the cross-slides 108 and 108a to ensure that the trenches cut by associated saw means are not deeper than is desired in any particular case.

Reverting now to FIGS. 2 and 3, a further such driven roller unit 4b is provided on the downstream side of the work station. The timber length 1 is advanced through this further driven roller unit 4b and thence onto output conveyor rollers 2a (not shown in FIG. 3) whence the finished timber length may be taken to a stockpile or elsewhere.

It will be appreciated that in addition to the saws referred to above, other tool means, for example, drills or routers may be mounted, together with their respective power sources on cross-slides of the work station 10 such as the cross-slides 108, 108a and it will further be appreciated that saw means may be arranged to traverse a baulk horizontally rather than vertically as described with reference to fIG. 6.

It is clear that a further work station and driven roller unit may be incorporated on the downstream side of the driven roller unit 4b between the unit 4b and a further drive roller unit, if the incorporation of all the desired tool means at one work station 10 would make the distance across it, and hence the distance between its two adjacent roller units 4a and 4b too great.

The operation of the drive shaft 5 and of the brake 7 as well as of the various pneumatic ram and cylinder devices, both those of the roller drive units 4, 4a and 4b and those of the, or each, work station 10 are susceptible of control by commercially available positional and sequence control mechanisms which in turn may be controlled or actuated from suitably preprogrammed punched tape.

A typical sequence of operations will be briefly described for the apparatus shown in FIGS. 2 to 6.

Firstly a timber workpiece which has been presawn to length is advanced on the infeed conveyor rollers 2 until it is brought against end stop 3. The upper idler roller 401 of the drive unit 4 engaged with the timber and the end stop 3 is then lowered.

At this stage the work station 10 is in rest condition. In this: the ram of cylinder 117 is operated to space the movable fence 11 on slide 111 as far as possible from the fixed fence 11 on fixed base member 115; the slides 108 and 108a are held fully withdrawn laterally and the blades 100 are in a starting position which may be fully up but for the purpose of this description will be referred to as fully down with rams 105 fully extended in cylinders 104.

The shaft 5 is then rotated to advance the workpiece a predetermined distance and to bring a preselected part of the workpiece opposite the blades 100 which are revolving. The shaft 5 is stopped and the workpiece arrested. The ram 118 is extended to bring the movable fence 11 on slide 111 toward the fixed fence so that the workpiece is clamped therebetween. Ram devices 121, 122, 123, 124 are then operated to move blade 100 a desired distance into the workpiece and following this or simultaneously the rams 105 are raised so that the blade 100 performs an upward stroke through the work. The blade is then withdrawn laterally and lowered to its starting position. If the operation so requires, the blades 100 on both sides of the work may be in operation simultaneously with like or differing cuts or trenches.

After the cutting or trenching has been performed at one location longitudinally of the workpiece, the movable fence 11 is disengaged so that the workpiece may be advanced and stopped by operation of the shaft 5 to bring a predetermined new location opposite the tool of the work station 10. This effected, the workpiece is again clamped between the side fences 11 and operated on by the tool.

It will be appreciated that when the leading end of a workpiece is in the work station 10, clamping in the vertical sense will be performed by the roller drive units 4 and 4a and that only after the leading end has reached unit 4b will this unit assist with vertical clamping in the arrangement illustrated. It is envisaged, however, that for some jobs a vertical clamp may be desirable in the work station itself, Such a clamp would conveniently be mounted on the fixed fence 11.

Figure 7:
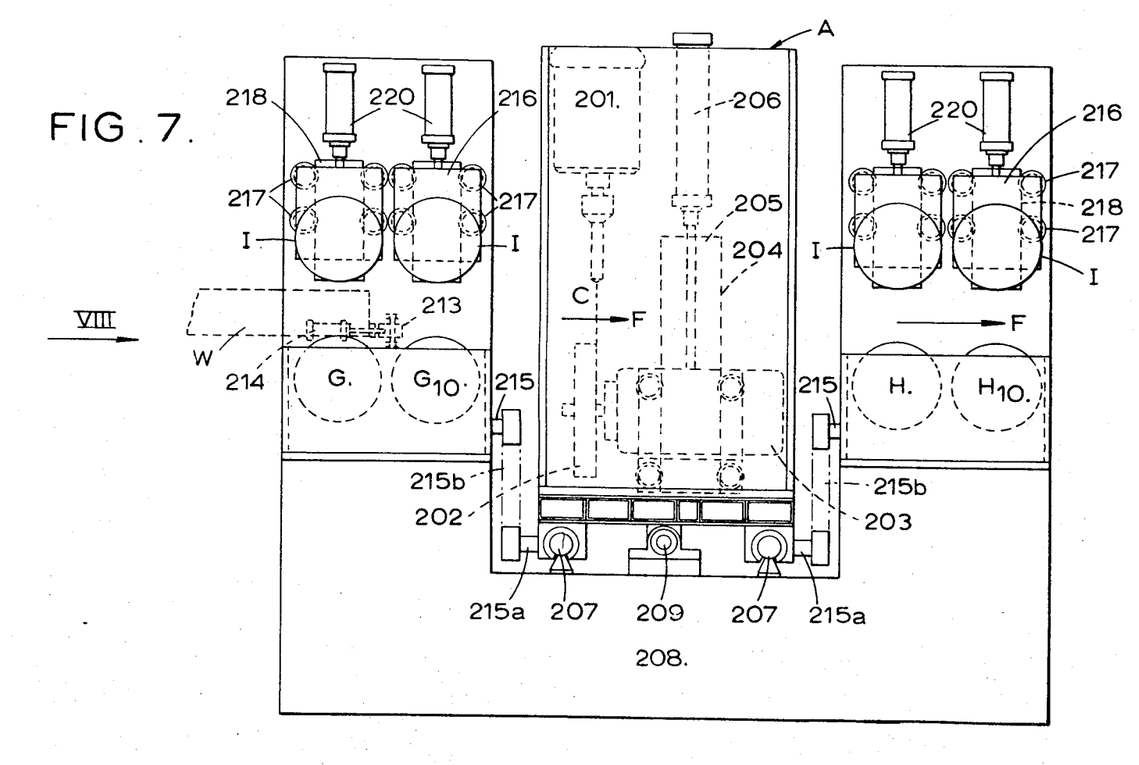
FIG. 7 is a side view of a second embodiment of apparatus according to this invention.
Figure 8:
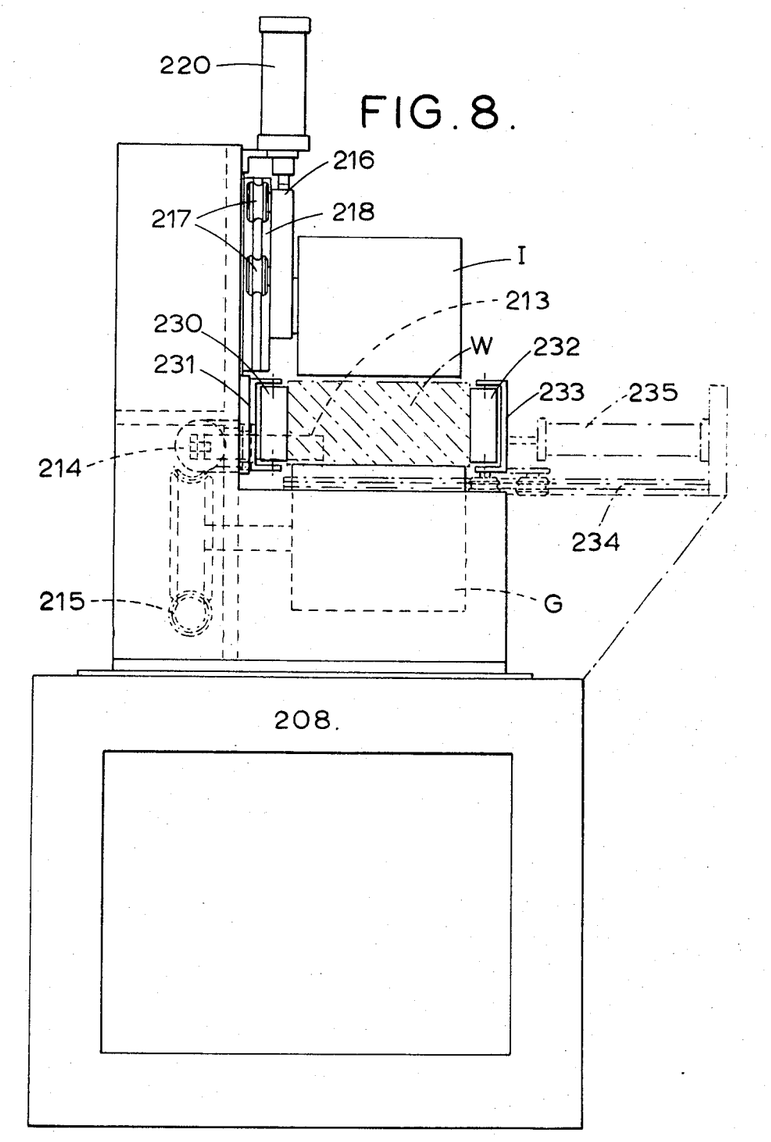
FIG. 8 is an end view taken in the direction of the arrow VIII of FIG. 7, FIGS. 9 and 10 are diagrammatic side views illustrating the main principles of the invention.
Figure 10A:
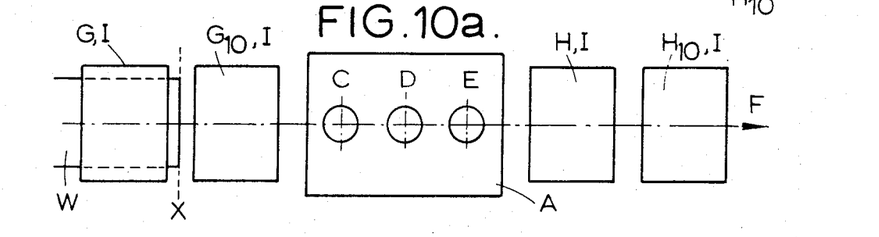

We refer now to FIGS. 7 and 8, FIG. 8 being an end view taken in the direction of arrow VIII of FIG. 7. In these Figures is illustrated a wood working machine constructed in accordance with the principles previously discussed with reference to FIGS. 10 and 10a.

In FIG. 7, A represents a work station incorporating a drill 201 operating at a position C, and a trenching saw 202 driven by a motor 203. The motor 203 is movable vertically on a slide 204 of a post 205 under the control of a ram and cylinder device 206. The post 205 is movable laterally on slides 207 of a machine bed 208, under the control of a leadscrew 209 driven by a motor (not shown).

On the upstream or input side of the work station A is a twin drive roller unit with drive rollers G and G10 each with a co-operating idler roller I.

On the downstream or output side of the work station A is a twin roller drive unit with drive rollers H and H10 each with a co-operating idler roller I.

The upstream and downstream twin roller drive units are identical except that the upstream unit has an end stop 213 movable into or out of the path of a workpiece W under the control of a ram and cylinder device 214. All drive rollers G, G10, H and H10 are driven in synchronism from shafts 215 by way of worm and pinion gearing (see FIG. 8). 215a is an intermediate shaft geared to the shafts 215 by a toothed belt 215b (FIG. 7).

As will be seen particularly from FIG. 8 the idler rollers I are each carried on a bracket 216 which is equipped with rollers 217 engaging in vertical tracks of a member 218 fixed in relation to the machine bed 208. The bracket 216 together with idler rollers I are movable vertically under the control of ram and cylinder devices 220. This movement is such as to allow the idler rollers to press timber of predetermined range of thickness against the drive rollers.

As seen in FIG. 8, a fixed side fence for the workpiece is constituted by rollers 230 carried in brackets 231 fixed below slide member 218. A movable side fence is constituted by rollers 232 carried by brackets 233 which are slidable laterally on slides 234 fixed in relation to the bed 208. Lateral movement of the rollers 232 is effected by ram and cylinder devices 235. Such lateral movement is required to accommodate workpieces of different width.

In operation the path followed by the workpiece W is indicated by the arrows F. The leading end of the workpiece W is first moved against the end stop 213 which is placed in its path by operation of ram and cylinder device 214. The distance between the end stop 213 and the operating position C of the drill 201 is known and hence when the end stop 213 has been removed the drive shafts 215 can be rotated to advance the workpiece along path F to bring a selected location of the workpiece to position C. The tools 201 or 202 or both may then operate on the workpiece. At all times after stop 213 has been withdrawn and while the workpiece is engaged with a drive roller, its cooperating idler roller I will be urged downwardly by its ram and cylinder device 220 to press the workpiece W against the drive roller.

The operation of the various components in correct sequence, including the advancing of the workpiece over preselected distances between successive working operations, is preferably governed by numerical control apparatus of known type.

It will be appreciated that while the embodiments of the invention illustrated are arranged and intended for operation on timber lengths, the invention is equally applicable to the positioning of other workpieces to bring preselected locations opposite working tools.

I claim:

1. A method of performing a succession of working operations at preselected locations along the length of an elongate workpiece, including advancing said workpiece longitudinally into a machine up to a datum position, sensing the position of said workpiece, engaging the workpiece with a feed roller positioned before said datum position, pressing on said workpiece from above with at least one idler roller to insure engagement between said feed roller and said workpiece, causing said feed roller to rotate through a predetermined angle of rotation to advance said workpiece beyond said datum position to a work station at a predetermined distance from said datum position, stopping rotation of said feed roller to stop advancement of said workpiece, performing work on said workpiece at said work station, and automatically causing said feed roller to rotate through successive predetermined degrees of rotation to advance said workpiece successive predetermined distances, with at least some of said predetermined degrees of rotation and thus some of said predetermined distances being different, stopping advancement of said workpiece at the end of each successive predetermined distance, and performing work on said workpiece at successive predetermined locations longitudinally thereof when said workpiece is stopped, so that a variety of successive working operations may be performed on said workpiece.

2. A method as defined in claim 1 including the steps of employing conveying means each comprising at least one drive roller located adjacent the path of the workpiece at each of the upstream and downstream sides of the work station, and driving said drive roller in synchronism to control advance movement of the workpiece through the work station, and also employing overhead movable idler pressure rollers, one associated with each conveying means, to hold the workpiece against the conveying means.

3. A method as defined in claim 2 wherein said working tool is caused to operate on the workpiece only during time intervals when said drive rollers are stationary.

4. A method as defined in claim 2 including providing at least two working tools in said work station each at a predetermined distance from said datum position and including the step of causing at least one tool to work the workpiece during each time interval when said drive rollers are stationary.

5. A method as defined in claim 1 including controlling the acceleration and deceleration of the movements of the workpiece to enhance the accuracy of movement thereof.

6. A method of performing a succession of working operations at preselected locations along the length of an elongate workpiece, including advancing said workpiece longitudinally up to a datum position, sensing the position of said workpiece, engaging the workpiece with a feed means in advance of said datum position, pressing on said workpiece from above the insure engagement between said feed means and said workpiece, advancing said workpiece beyond said datum position to a work station at a predetermined distance from said datum position, stopping advancement of said workpiece, performing work on said workpiece at said work station, and automatically advancing said workpiece through successive predetermined distances, with at least some of said successive distances being different, stopping advancement of said workpiece at the end of each successive predetermined distance, and performing work on said workpiece at successive predetermined locations longitudinally thereof when said workpiece is stopped, so that a variety of successive working operations may be performed on said workpiece.

7. A method as defined in claim 6, including controlling the acceleration and deceleration of the movements of the workpiece to enhance the accuracy of movement thereof.

* * * * *